United States Patent [19]

Mathes et al.

[11] 4,023,670

[45] May 17, 1977

[54] AUTOMATIC MASTER FRAME TRANSPORT APPARATUS

[75] Inventors: Alva F. Mathes, Rochester; Eugene Lemieux, Albion, both of N.Y.

[73] Assignee: Eastman Kodak Company, Rochester, N.Y.

[22] Filed: Jan. 14, 1976

[21] Appl. No.: 648,838

[52] U.S. Cl. .............................. 198/604; 198/552; 198/616; 198/637; 198/485; 271/3.1; 271/64; 355/102

[51] Int. Cl.² ...................................... B65G 37/00

[58] Field of Search ............... 198/28, 38, 85, 163, 198/485, 552, 604, 616, 637; 271/3.1, 4, 64; 355/53, 100, 102, 109

[56] References Cited

UNITED STATES PATENTS

| 477,874 | 6/1892 | Sterling | 198/163 |
|---|---|---|---|
| 898,250 | 9/1908 | Mitchell | 198/163 X |
| 1,193,118 | 8/1916 | Buck | 198/28 |
| 1,854,287 | 4/1932 | Alvey | 198/28 |
| 1,870,583 | 8/1932 | Olson | 198/38 |
| 2,890,456 | 6/1959 | Runciman | 198/85 X |
| 2,920,744 | 1/1960 | Burke et al. | 198/85 |
| 3,083,960 | 4/1963 | Coronado et al. | 271/4 |
| 3,645,615 | 2/1972 | Spear, Jr. | 271/3.1 |
| 3,698,602 | 10/1972 | Gnage | 271/3.1 UX |

FOREIGN PATENTS OR APPLICATIONS 1,141,116   6/1961   Germany ............................ 271/3.1

*Primary Examiner*—Evon C. Blunk
*Assistant Examiner*—Richard K. Thomson
*Attorney, Agent, or Firm*—S. W. Gremban

[57] ABSTRACT

An apparatus suitable for use in transporting microfiche master frames, preferably containing microfiche, either from a loading station to an operating station and from the operating station selectively back to the loading station for a repeat transport by said apparatus, or to an exit station. The transport apparatus comprises a feed mechanism for feeding a master frame from the loading station to the operating station, and from the operating station to an elevator. The elevator lifts the master frame which is then selectively ejected from the elevator to either a recycle means or an exit means. The exit means delivers the master frames ejected thereto to an exit station from where the master frames may be removed from the transport apparatus, while the recycle means delivers the master frames delivered thereto back to the loading station from where the master frames are recycled through the transport apparatus.

4 Claims, 3 Drawing Figures

AUTOMATIC MASTER FRAME TRANSPORT APPARATUS

BACKGROUND OF THE INVENTION

1. Field of the Invention

An apparatus for transporting microfiche master frames, preferably containing microfiche, to and from an operating station, and more particularly for feeding master frames to the operating station and then selectively delivering the master frames to a loading station for recycling through the transport apparatus or ejecting the master frames to an exit station.

2. Description of the Prior Art

Transport apparatus for use in copying and duplicating machines are known in the art. U.S. Pat. No. 3,836,252 discloses a microfiche duplicator having a copyboard upon which a microfiche master to be copied is manually placed. The microfiche master is transported to a copying station wherein a preselected number of copies are produced. The microfiche master is then transported back to its original loading position; the copies are transported to a collection tray. This type of duplicating apparatus is generally unsuitable for high speed copying of large numbers of microfiche masters since each master must be manually fed into the duplicating apparatus.

U.S. Pat. No. 3,503,679 describes a photocomposing machine wherein a stack of framed originals are placed in a loading magazine. The transport apparatus of the photocomposing machine automatically picks up an original from the loading magazine and moves the original into position of exposure. After making a preselected number of exposures, the transport apparatus transfers the original from the exposure station to an exit receptacle. Although the disclosed photocomposing machine has a transport apparatus which automatically feeds in a plurality of framed originals, there is no provision for automatically recycling the copied framed originals back to the loading magazine for repeated copying. This provision is preferable when it is desired to produce a plurality of collated sets of copies from a set of originals. Without the recycling provision, collation would generally be done manually.

An aperture card reproducer and duplicator is described in U.S. Pat. NO. 3,535,039. Master cards to be reproduced are stacked in a feed station and are transported to an exposure station wherein a preselected number of copies are mde, and then transported to an exit hopper. The transport apparatus disclosed for use in the aperture card reproducer and duplicator is not capable of recycling master cards from the exit hopper back to the feed station and thus, as discussed in connection with the photocomposing machined described in U.S. Pat. No. 3,503,679, generally requires that collation be done manually.

A printer system described in U.S. Pat. No. 3,709,595 employs a transport system which transports a document from the bottom of a document stack loaded in a feed station to an exposure station wherein a preselected number of copies are made. The copied document is then returned to and deposited on the top of the document stack for eventual recirculation through the printer. This patent does not disclose means for selectively removing individual documents from the transport system while recirculating the remaining documents through the printer.

SUMMARY OF THE INVENTION

An apparatus is provided in accordance with the present invention which is capable of transporting a microfiche master frame from a loading station to an operating station such as an exposure station, and then either returning the master frame to the loading station for repeated transport through the operating station when collated sets are desired, or delivering the master frame to an exit station when single copies are desired. In a presently perferred embodiment the transport apparatus comprises means for feeding a master frame from a loading station to an operating station, and means for selectively transferring the master frame from the operating station to either an exit means that delivers the master frame to the exit station or to a recycle means that returns the master frame to the loading station for a repeated transport through the operating station.

BRIEF DESCRIPTION OF THE DRAWINGS

In the detailed description of the preferred embodiments of the invention presented below, reference is made to the accompanying drawings in which.

DESCRIPTION OF THE PREFERRED EMBODIMENTS

Because document transport apparatus are well known, the present description will be directed to elements forming part of, or cooperating more directly with, apparatus in accordance with the present invention. Elements of a document transport apparatus not specifically shown or described should be understood to be selectable from those known in the art.

Figure 1:
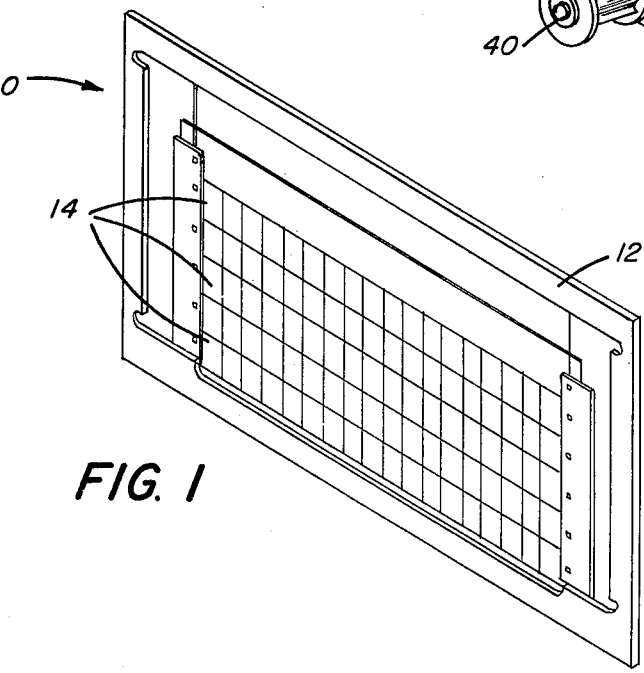
FIG. 1 is a perspective view showing an example of a master frame suitable for transport by a transport apparatus in accordance with the present invention.

An automatic master frame transport apparatus is described which is capable of transporting microfiche mounted in a master frame. Referring to FIG. 1, a microfiche master frame 10 is shown which comprises a generally rectangular plastic master frame element 12 having a plurality of microfiche master strips (several of which are indicated by the numeral 14) attached at each end to the frame element 12. The transport apparatus described herein utilizes only the master frame element 12 for purposes of transport. Therefore, it will be apparent that an empty frame element 12, a frame element 12 having a solid piece of microfiche attached thereto, or a frame element 12 containing any type of sheet or document attached thereto, may be transported by transport apparatus described herein equally as well as the one example shown in FIG. 1.

Figure 2:
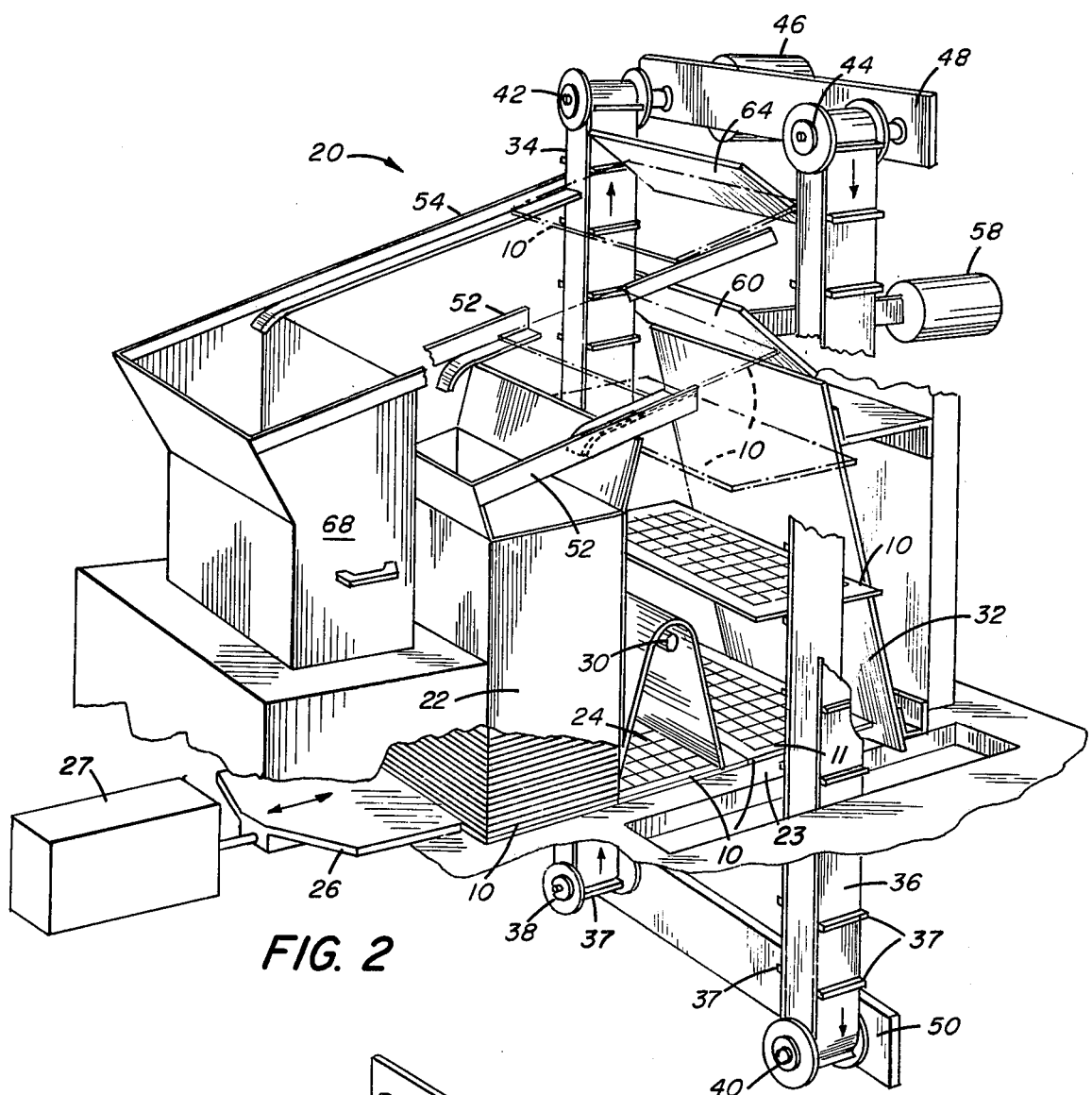
FIG. 2 is a perspective view showing a presently preferred embodiment of the transport apparatus of this invention.

FIG. 2 shows a transport apparatus which is a presently preferred embodiment of the invention. The transport apparatus, generally denoted 20, comprises a loading bin 22 for storing a plurality of master frames 10 in a vertical stack. The height to which master frames 10 may be stacked, and thus the capacity of loading bin 22, is limited by the height of bin 22. Master frames 10 are fed individually from loading bin 22 along a pair of support rails, one of which is partially shown and enumerated 23 to an operating station such as an exposure station 24 by a reciprocally movable shucker element 26. Shucker element 26 is actuated by a known motor and scotch yoke mechanism 27 which imparts the desired motion to element 26. The shucker element 26 is generally the same height as a single master frame 10, and slides transversely towards operating station 24 causing the leading end thereof to engage and push a master frame 10 from the bottom of the stack of master frames in the loading bin 22 along support rails 23 to exposure station 24, the remaining master frames 10 being supported by shucker element 26. When the shucker element 26 is retracted to the position shown in FIG. 2, the stack of master frames 10 drops down a distance equal to the height of the removed master frame 10.

With the master frame 10 in the exposure station 24, a preselected number of exposures are made by briefly energizing a xenon flash tube 30 on a film strip (not shown) intermittently advanced to the exposure station. Alternatively, the operating station could be used as a viewing station or for performing any other operation with master frame 10. After all operations performed in operating station 24 concerning master frame 10 are completed, shucker element 26 strips another master frame 10 from the vertical stack in loading bin 22 and slides the master frame into operating station 24, thereby pushing the previously copied master frame from operating station 24 to a lifting position 11. A portion of a ramp member 32 ensures that the inertical motion of the copied master frame 10 does not cause the master frame to slide past the position indicated. In a similar manner, the master frame 10 at the lifting position acts as a stop to prevent the succeeding master frame from sliding further into operating station 24 than is desired.

Figure 3:
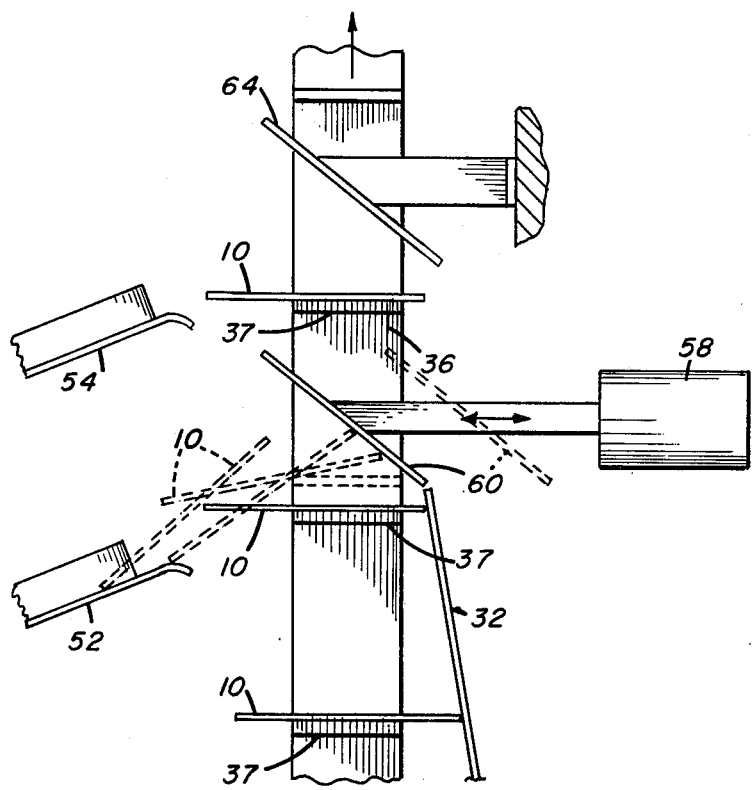
FIG. 3 is a segmental side elevational view partially in section of a portion of the transport apparatus located at the lifting station.

A master frame 10 in the lifting position 11 is lifted by an elevator assembly. In the embodiment shown in FIG. 2, the elevator assembly comprises a pair of vertically elongated endless belt members 34 and 36 having a plurality of laterally protruding ribs 37. Each of the belt members 34 and 36 is supported at one end by a guide roller 38 and 40 respectively, and at the opposite end by a drive roller 42 and 44 respectively. The drive rollers 42 and 44 are driven by a motor 46 and are mounted to an upper roller support plate 48. The guide rollers 38 and 40 are similarly mounted to a lower roller support plate 50. As belt members 34 and 36 are advanced, a pair of complementary aligned protruding ribs 37 engage the end portions of master frame 10 and lift the master frame to either a recycle slide member 52 or to an exit slide member 54 as illustrated in FIGS. 2 and 3. As master frame 10 is being lifted by ribs 37, inclined ramp member 32 continually causes master frame 10 to partially slide horizontally along ribs 37 which support the master frame. If it is desired to transfer master frame 10 from the elevator assembly to recycle slide member 52 (which returns a master frame 10 thereon, shown in phantom, to the loading bin 22) an air piston 58 is activated which positions a recycle ramp 60 as shown. A master frame 10, shown in phantom which has been partially slid from ribs 37 is completely slid from ribs 37 by recycle ramp 60 onto recycle slide member 52. Similarly, an exit ramp 64, which need not be movable, is positioned to transfer a master frame from the elevator assembly to the exit slide member 54.

Master frames 10 transferred to exit slide member 54 are delivered to an exit hopper 68. Depending upon the speed at which the transport apparatus 20 operates, it may be desirable to equip each of the slide members 52 and 54 with a plurality of openings through which air is forced to provide an air bearing over which the master frames may easily slide.

To assure that the last master frame printed is transported from the exposure station to the elevator, a dummy master frame is provided which is placed on the bottom of the first input group of master frames. The dummy master frame comprises a standard plastic master frame without an aperture for holding fiche. When the dummy master frame is initially loaded into the apparatus, the shucker element 26 shucks the dummy master frame first. During subsequent operation, the dummy master frame which is always recycled via the first master frame and hence is the last master frame to be fed by the shucker element for any input group, winds up properly positioned at the exposing station. Accordingly, then the first master frame of any input group of frames is fed into the exposing station, the dummy master frame which is moved to the lifting position serves to properly position the first frame at the exposing station.

The belt members 34 and 36 may be advanced continuously or in discrete steps. If belt members 34 and 36 are advanced in steps from a normal stop position in which the space vbetween succeeding ribs 37 is in alignment with the frame support surfaces of rails 23, it may be convenient to cause belts 34 and 36 to be advanced the distance between adjacent ribs 37 each time shucker element 26 operates. In this way, master frame 11 will always enter a space between succeeding ribs 37, and upon operation of the belts 34 and 36 a pair of ribs 37 will engage the next master frame. If the belts are to be advanced continuously, as would probably occur during high speed operation, some means should preferably be provided for coordinating the position of ribs 37 with the operation of shucker element 26 to prevent ribs 37 from being in a position which interferes with a master frame advanced by shucker element 26. One such means is to employ a photodetector (not shown) or similar device to check the position of ribs 37 just before shucker element 26 operates. If rubs 37 are momentarily in an interfering position, the operation of shucker element 26 can be slightly delayed by any suitable time delay means.

The invention has been described in detail with particular reference to preferred embodiments thereof, but it will be understood that variations and modifications can be effected within the spirit and scope of the invention. For example, although only an exit slide member and a recycle slide member are shown, any number of slide members may be provided to exit, store or recycle the master frames.

What is claimed is:

1. A transport apparatus suitable for use in transporting microfiche master frames, said apparatus comprising:

means defining a loading station for storing a plurality of master frames to be transported by said apparatus;

means defining an operating station;

a pair of conveying belt members spaced apart to receive a master frame therebetween at a lifting station, said belt members adapted to be advanced in a substantially vertical direction;

a plurality of ribs on each of said belt members for supporting a master frame thereon;

feeding means for feeding first and second master frames from said loading station to said operating station in succession, said second master frame when fed to said operating station engaging and feeding said first master frame from said operating station to said lifting station where said first master frame is lifted by said ribs of said advancing belt members;

means defining an exit station;

an exit slide member for delivering a master frame from said belt members to said exit station; and first transferring means for tranferring a master frame being lifted by said belt members from said ribs to said exit slide member which delivers the master frame to said exit station.

2. Apparatus as claimed in claim 1 further comprising:

a recycle slide member interposed between said lifting station and said exit slide member for returning a master frame from said belt members to said loading station;

second transferring means movable from a normal nontransferring position to a transferring position for transferring a master frame being lifted by said belt members from said ribs to said recycle slide member; and means for moving said second transferring means to said transferring position when it is desired to transfer a master frame from said belt members to said recycle slide member rather than to said exit slide member.

3. Apparatus as claimed in claim 2 wherein:

said first transferring means comprises a first inclined ramp member adapted to be interposed between said spaced belt members for sliding an advancing master frame from said ribs onto said exit slide member; and said second transferring means comprises a second inclined ramp member adapted to be interposed between said spaced belt members for sliding an advancing master frame from said ribs onto said recycle slide member.

4. Apparatus as claimed in claim 1 further comprising:

at least one slide member in addition to said exit slide member for delivering a master frame to one station other than said exit station; and one transferring means in addition to said first transferring means for transferring a master frame being lifted by said belt members from said belt members to said one slide member.

* * * * *